United States Patent
Orr et al.

(10) Patent No.: US 9,258,701 B2
(45) Date of Patent: *Feb. 9, 2016

(54) ADDING RANDOMNESS INTERNALLY TO A WIRELESS MOBILE COMMUNICATION DEVICE

(71) Applicant: BlackBerry Limited, Waterloo (CA)

(72) Inventors: Kevin H. Orr, Waterloo (CA); Scott D. Rose, Waterloo (CA); Herbert A. Little, Waterloo (CA)

(73) Assignee: BlackBerry Limited, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/224,660

(22) Filed: Mar. 25, 2014

(65) Prior Publication Data

US 2014/0205098 A1      Jul. 24, 2014

Related U.S. Application Data

(63) Continuation of application No. 13/723,660, filed on Dec. 21, 2012, now Pat. No. 8,903,085, which is a continuation of application No. 12/624,956, filed on Nov. 24, 2009, now Pat. No. 8,355,503, which is a continuation of application No. 11/123,222, filed on May 6, 2005, now Pat. No. 7,643,633.

(51) Int. Cl.

| | | |
|---|---|---|
| H04L 9/00 | (2006.01) | |
| H04W 12/04 | (2009.01) | |
| G06F 7/58 | (2006.01) | |
| H04W 12/00 | (2009.01) | |
| H04W 12/08 | (2009.01) | |

(Continued)

(52) U.S. Cl.
CPC ............... *H04W 12/04* (2013.01); *G06F 7/588* (2013.01); *H04L 9/0869* (2013.01); *H04W 12/00* (2013.01); *H04W 12/08* (2013.01); *H04L 9/0861* (2013.01); *H04L 63/068* (2013.01)

(58) Field of Classification Search
None
See application file for complete search history.

(56) References Cited

U.S. PATENT DOCUMENTS

| | | | | |
|---|---|---|---|---|
| 4,484,297 | A * | 11/1984 | Maier et al. | 708/250 |
| 4,716,574 | A * | 12/1987 | Baier et al. | 375/141 |
| 6,215,874 | B1 * | 4/2001 | Borza et al. | 380/46 |

(Continued)

FOREIGN PATENT DOCUMENTS

| | | |
|---|---|---|
| CN | 1456981 | 11/2003 |
| WO | 0195091 | 12/2001 |

OTHER PUBLICATIONS

European Search Report, Application No. 05252804.9, Dated Sep. 5, 2012.

*Primary Examiner* — Jason K. Gee
*Assistant Examiner* — Olanrewaju Bucknor
(74) *Attorney, Agent, or Firm* — Ridout & Maybee LLP

(57) ABSTRACT

An electronic device is provided with an integral transducer used to update a random data pool without connection to an external source of new random data. In one embodiment, there is provided a method for providing random data on an electronic device, the method comprising: storing random data in a random data pool in a memory; sensing motion of the electronic device using a transducer integrally carried as part of the electronic device, wherein the transducer is configured to generate an output in response to sensed motion; generating new random data in accordance with the output of a transducer when sensed motion exceeds a threshold; and storing the new random data in the random data pool in the memory.

16 Claims, 4 Drawing Sheets

(51) Int. Cl.
  *H04L 9/08* (2006.01)
  *H04L 29/06* (2006.01)

(56) References Cited

U.S. PATENT DOCUMENTS

| | | | |
|---|---|---|---|
| 6,233,545 B1 * | 5/2001 | Datig | G06N 3/004 704/2 |
| 6,430,170 B1 | 8/2002 | Saints et al. | |
| 6,463,150 B1 * | 10/2002 | Moldovyan et al. | 380/28 |
| 6,590,981 B2 | 7/2003 | Fruehauf et al. | |
| 6,801,626 B1 * | 10/2004 | Nambu | 380/256 |
| 7,466,444 B2 * | 12/2008 | Silverbrook | B41J 3/445 347/109 |
| 7,894,095 B2 * | 2/2011 | Silverbrook | B41J 3/445 358/1.15 |
| 2001/0011252 A1 | 8/2001 | Kasahara | |
| 2002/0165888 A1 | 11/2002 | Kim | |
| 2003/0009667 A1 | 1/2003 | Horiuchi et al. | |
| 2003/0021411 A1 | 1/2003 | Seroussi et al. | |
| 2004/0128560 A1 * | 7/2004 | Challener et al. | 713/202 |
| 2005/0082664 A1 | 4/2005 | Funaba et al. | |
| 2005/0287506 A1 | 12/2005 | Bozzone et al. | |
| 2006/0077729 A1 | 4/2006 | Lin et al. | |

* cited by examiner

ADDING RANDOMNESS INTERNALLY TO A WIRELESS MOBILE COMMUNICATION DEVICE

CROSS-REFERENCE TO RELATED APPLICATIONS

This application is a continuation of U.S. patent application Ser. No. 13/723,660, filed on Dec. 21, 2012, which is a continuation of U.S. application Ser. No. 12/624,956, filed on Nov. 24, 2009 (now U.S. Pat. No. 8,355,503 issued on Jan. 15, 2013), which is a continuation of U.S. patent application Ser. No. 11/123,222, filed on May 6, 2005 (now U.S. Pat. No. 7,643,633, issued on Jan. 5, 2010), the content of all these applications being incorporated herein by reference.

TECHNICAL FIELD

This application generally relates to mobile wireless communication devices requiring random data for use in normal device operation.

RELATED ART

A need for random data in normal operation of mobile wireless communication devices is now common place. For example, secure encrypted communication requires generation of suitable encryption/decryption keys or the like from time to time. Generation of an encryption key may be required for device content (e.g., e-mail, calendar, memo pad, contacts, etc.). Wireless communication via Bluetooth or other similar techniques may also require random data inputs from time to time. It is also known that random data may be used to wipe non-volatile memory. For example, in order to insure erased data on a hard drive is unrecoverable, a technique of writing random data to the drive may be employed.

There are known techniques for generating sufficiently random data (e.g., by capturing random mouse movements of a user or the like) at a base station (e.g., a user's personal computer) and then may derive a key for communication or alternative purposes. This key may be stored on a communications server, desktop PC, as well as the handheld device. The newly captured random data and/or derived key may be transferred to associated devices from time to time when the need arises.

However, if a mobile wireless communication device is without an external source of renewable random data (e.g., a plug in connection to the user's base or desktop computer), one needs to address the need for sufficiently random data to use in the generation of a random pattern (e.g., for encryption key generation). Typically when the stored key or random data becomes out of date and the user has connected his/her device to a base or desktop computer, they may be prompted to move a mouse around randomly for generation of a new random number pool for use as an encryption key (or to be used in generation of such key).

A problem to address is how to create the same or approximately equivalent randomness for key creation by random motion once the device no longer connects via serial/USB to the user's desktop.

A similar situation can arise with other peripherals or memory cards which attach to the device that require a method of securing data via a randomly generated pattern for encryption key creation, e.g., secure data (SD) cards, multimedia cards, compact flash, smartcards, Bluetooth accessories, etc.

BRIEF DESCRIPTION OF THE DRAWINGS

These and other objects and advantages will be better understood and appreciated in conjunction with the following detailed description of exemplary embodiments taken together with the accompanying drawings, of which.

DETAILED DESCRIPTION OF EXAMPLE EMBODIMENTS

Figure 1:
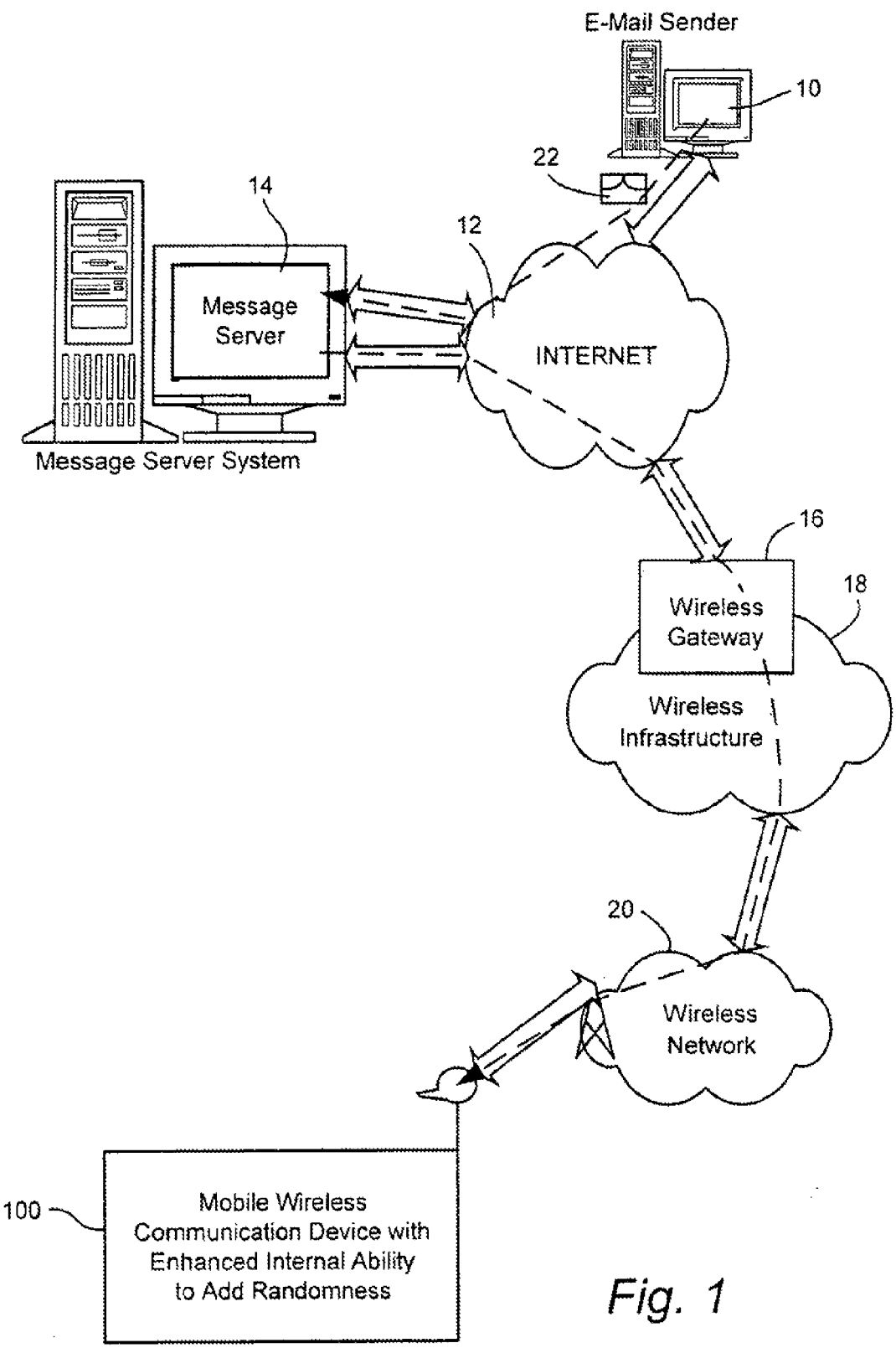
FIG. 1 is an overall system wide schematic view of an exemplary wireless email communication system incorporating a mobile wireless communication device having enhanced internal ability to add randomness to a random data pool maintained therein.

A wireless mobile communication device may include its own integral apparatus/method for generating new random data as needed or desired.

For example, such a device may include a data memory storing random data for use in data communication processes (e.g., encrypted secure processes). A transducer integrally carried as part of the mobile communication device can be adapted to produce electrically sensible output related to a physically sensible parameter. The electrically sensible output of the transducer is then captured within the mobile communication device and used to generate new random data and store it in the random data memory based on the electrically sensible output while the physical parameter is randomly varying.

The present exemplary embodiments provide a general solution for locally generating random data for the purpose, for example, of generating an encryption key for securing data.

This can be accomplished locally on a mobile device if it is equipped with a method to detect, measure, and record random motion (analogous to mouse movement). There are many possible arrangements available to achieve this, e.g.:

(1) By using an accelerometer or gyroscope type of sensor the user can move the device around by tilting or gesturing in random movement. Also, the device could be placed on a flat surface and the acceleration (translational motion) could be measured (e.g., like mouse movements). The movement may be in a required direction of three dimensional space if the sensor responds preferentially in one direction.

(2) Using optical scanning technique such as with a camera that is integrated with the device, it could work like an optical mouse, i.e., the handheld could be placed on a surface for position tracking.

(3) Using as sources of random input transducers such as ambient light sensor, microphone, digital compass, fingerprint sensor, navigation input sensor devices such as a roller ball, touch screen, joystick, touch pad, etc.

(4) Outputs from different random sources can be further intermixed (e.g., via bit swapping, bit shifting, etc.) before being added to the random data pool.

The system may prompt the user to randomly move the device to generate data for creating the new random key data (analogous to a current desktop application). During a set period of time the output of the sensors can be read and this resulting random sensor data can be used to generate random key data.

As an alternative, depending on the electrical current draw of the sensor, this could be used continually, or frequently, to harvest randomness from the user. That is, the system could turn on the accelerometer or take a picture every so many seconds to gather randomness that is added to a pool of randomness whenever needed or desired. The process for administering the random pool of data can be notified by the system to intercept sensor data whenever the sensor has been enabled by another application. For example, an accelerometer may be set to detect random device motion based on pre-programmed threshold limits and interrupt the system to read the accelerometer data.

These embodiments may be realized in hardware, software or a combination of hardware and software and provide a method for internally adding randomness to wireless communication device. The exemplary embodiment is realized at least in part, by executable computer program code which may be embodied in physical program memory media.

FIG. 1 is an overview of an exemplary communication system in which a wireless communication device 100 may be used in accordance with this invention. One skilled in the art will appreciate that there may be hundreds of different system topologies. There may also be many message senders and recipients. The simple exemplary system shown in FIG. 1 is for illustrative purposes only, and shows perhaps the currently most prevalent Internet email environment.

FIG. 1 shows an email sender 10, the Internet 12, a message server system 14, a wireless gateway 16, wireless infrastructure 18, a wireless network 20 and a mobile communication device 100.

An email sender 10 may, for example, be connected to an ISP (Internet service Provider) on which a user of the system has an account, located within a company, possibly connected to a local area network (LAN), and connected to the Internet 12, or connected to the Internet 12 through a large ASP (application service provider) such as America Online™ (AOL). Those skilled in the art will appreciate that the systems shown in FIG. 1 may instead be connected to a wide area network (WAN) other than the Internet, although email transfers are commonly accomplished through Internet-connected arrangements as shown in FIG. 1.

The message server 14 may be implemented, for example, on a network computer within the firewall of a corporation, a computer within an ISP or ASP system or the like, and acts as the main interface for email exchange over the Internet 12. Although other messaging systems might not require a message server system 14, a mobile device 100 configured for receiving and possibly sending email will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the invention described below. Message servers such as server 14 typically extend beyond just email sending and receiving; they also include dynamic database storage engines that have predefined database formats for data like calendars, to-do lists, task lists, email and documentation.

The wireless gateway 16 and infrastructure 18 provide a link between the Internet 12 and wireless network 20. The wireless infrastructure 18 determines the most likely network for locating a given user and tracks the users as they roam between countries or networks. A message is then delivered to the mobile device 100 via wireless transmission, typically at a radio frequency (RF), from a base station in the wireless network 20 to the mobile device 100. The particular network 20 may be virtually any wireless network over which messages may be exchanged with a mobile communication device.

As shown in FIG. 1, a composed email message 22 is sent by the email sender 10, located somewhere on the Internet 12. This message 22 typically uses traditional Simple Mail Transfer Protocol (SMTP), RFC 822 headers and Multipurpose Internet Mail Extension (MIME) body parts to define the format of the mail message. These techniques are all well known to those skilled in the art. The message 22 arrives at the message server 14 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific email address associated with the mobile device 100. In a preferred embodiment, messages addressed to a message server account associated with a host system such as a home computer or office computer which belongs to the user of a mobile device 100 are redirected from the message server 14 to the mobile device 100 as they are received. Messages will typically be encrypted from sender to receiver by utilizing a key that is unique to a given device. Examples of two commonly used methods are the Data Encryption Standard (Triple—DES) and the Advanced Encryption Standard (AES).

Regardless of the specific mechanism controlling forwarding of messages to mobile device 100, the message 22, or possibly a translated or reformatted version thereof, is sent to wireless gateway 16. The wireless infrastructure 18 includes a series of connections to wireless network 20. These connections could be Integrated Services Digital Network (ISDN), Frame Relay or TI connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Group Special Mobile or the Global System for Mobile Communications (GSM) and the General Packet Radio Service (GPRS) networks, and (3) future third-generation (3G) networks like Enhanced Datarates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
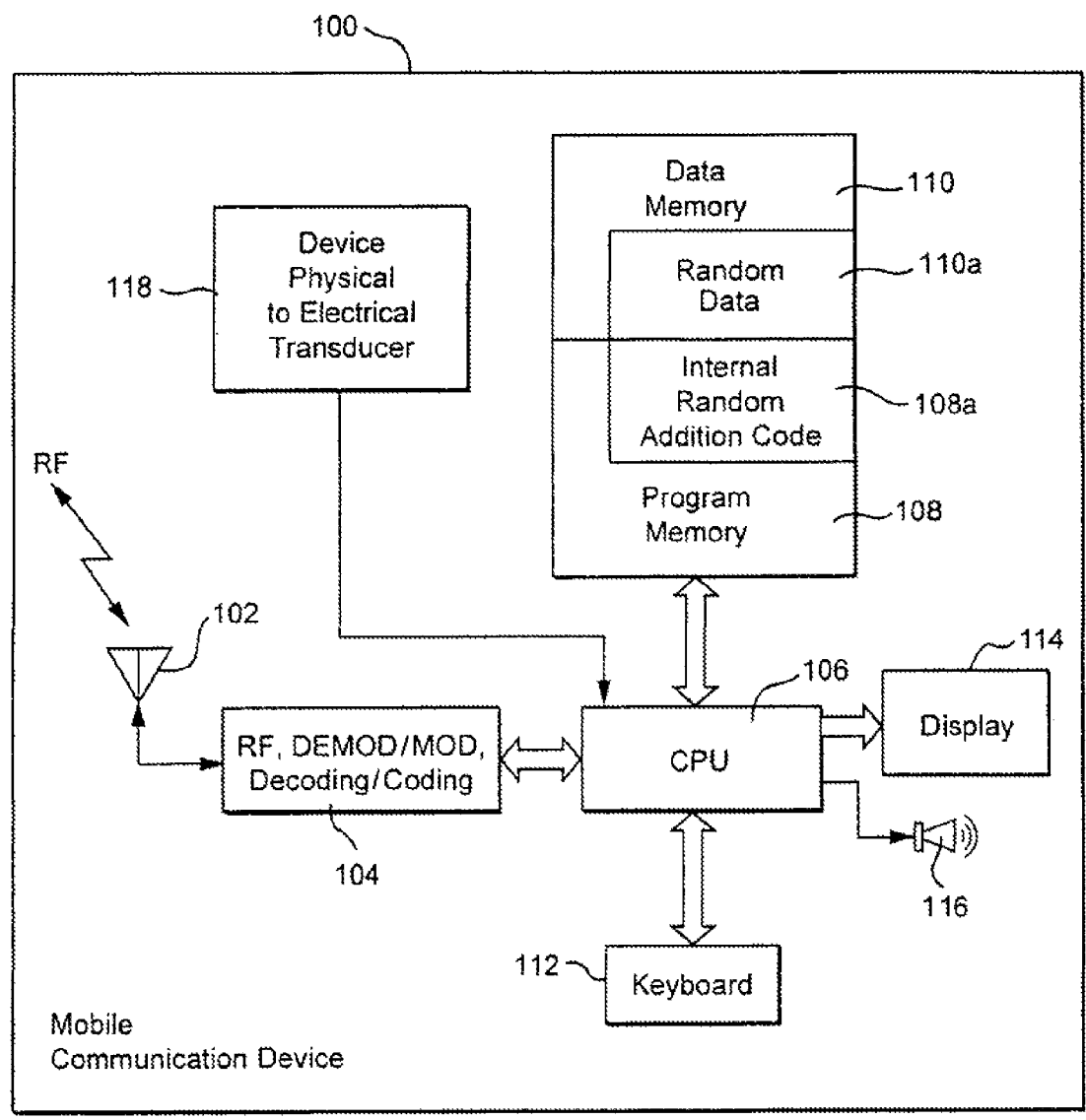
FIG. 2 is an abbreviated schematic diagram of hardware included within an exemplary mobile wireless communication device.

As depicted in FIG. 2, mobile communication device 100 includes a suitable RF antenna 102 for wireless communication to/from wireless network 20. Conventional RF, demodulation/modulation and decoding/coding circuits 104 are provided. As those in the art will appreciate, such circuits can involve possibly many digital signal processors (DSPs), microprocessors, filters, analog and digital circuits and the like. However, since such circuitry is well known in the art, it is not further described.

The mobile communication device 100 will also typically include a main control CPU 106 which operates under control of a stored program in program memory 108 (and which has access to data memory 110). CPU 106 also communicates with a conventional keyboard 112, display 114 (e.g., an LCD) and audio transducer or speaker 116. A portion of data memory 110a is available for storing random data needed for device operations. Suitable computer program executable code is stored in portions of program memory 108a to constitute the internal random addition capability described below. A transducer 118 provides an electrical input to the CPU 106 that corresponds to a randomized physical event. Some examples of possible physical transducers are: an accelerometer; a gyroscopic sensor; a tilt sensor; a movement sensor; optical sensor or scanner; relative-position tracking device like a mouse transducer, etc. Those in the art will recognize that the list of possible transducers is virtually unlimited.

Figure 3:
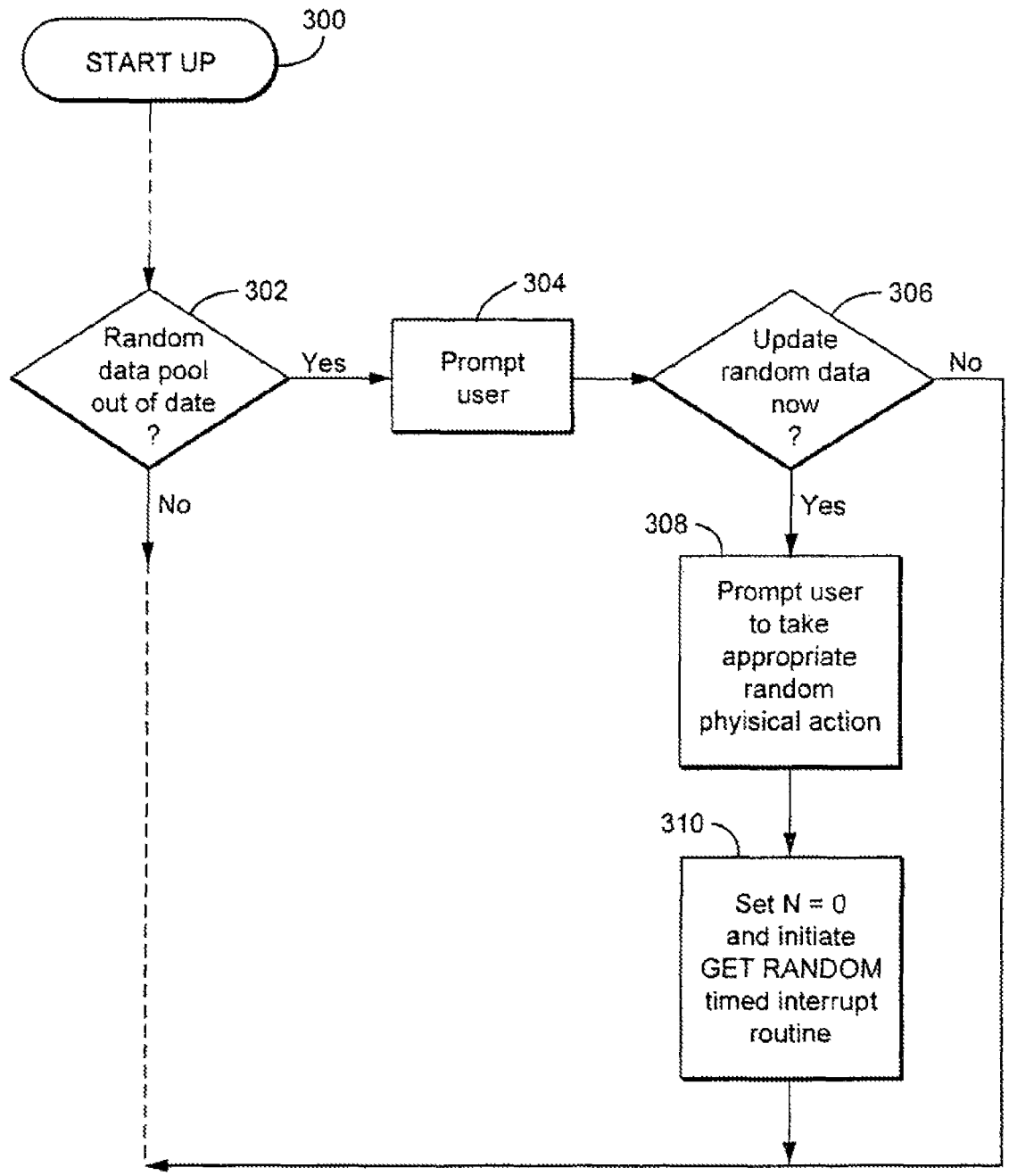
FIG. 3 is an exemplary abbreviated schematic flow diagram of computer software (i.e., program logic) that may be utilized in the device of FIG. 2 (e.g., during start-up) to re-initiate an update of random data being maintained in the device.

As those in the art also will appreciate, entry into the process of gathering new random data may be made in any desired way. As earlier noted, it may be effective at all times or at times whenever it is algorithmically determined to be needed or desirable. One other possibility is depicted at FIG. 3, where, during normal booting or start-up processes entered at 300, a test is made at an appropriate point 302 to determine whether the current random data pool in the device is out of date. If so, then the user is suitably prompted at 304 and if the user elects at 306 to update the random data at this time, then the user is further prompted at 308 to take appropriate random physical action that can be sensed by the transducer included as an integral part of the device. For example, the user may be instructed to randomly move the device in three dimensions for the next few (e.g. 15) seconds. After such instruction to the user, then a loop counter N may be set to zero and the GET timed interrupt routine may be initiated at 310.

Figure 4:
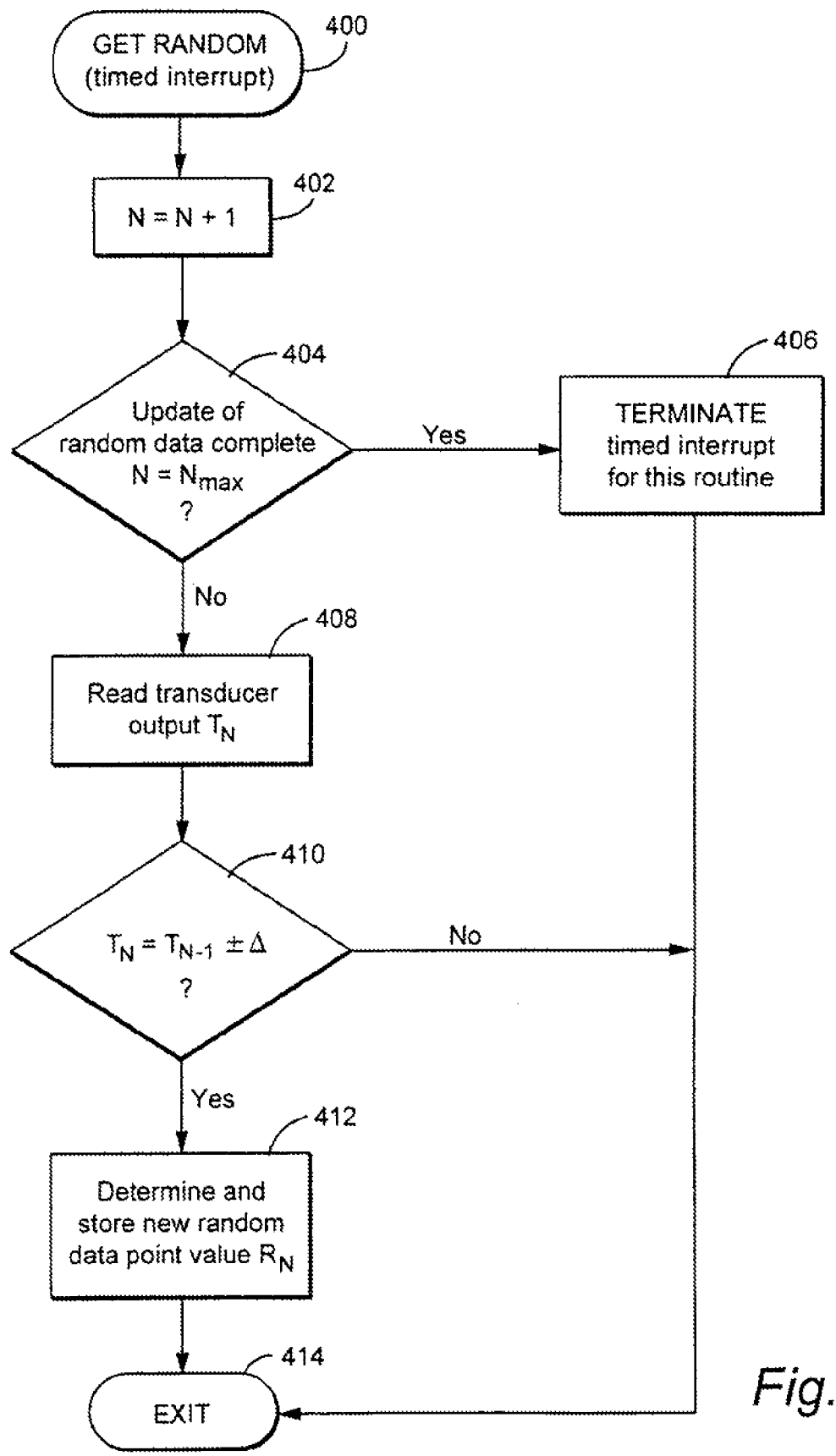
FIG. 4 is an exemplary abbreviated schematic flow diagram of computer software (i.e., program logic) that may be utilized in the device of FIG. 2 to interface with an included transducer for generating new random data.

The GET RANDOM routine 400 illustrated in FIG. 4 is, in this exemplary embodiment, a timed interrupt routine while active. For example, the timed interrupt may occur at intervals of a few tens of milliseconds or the like during the interval of instructed random physical activity (e.g., 15 seconds). The loop counter N is incremented at 402 and a test is made at 404 to see whether the updating of random data process has yet been completed. If so, then the timed interrupt routine is suitably terminated at 406 (unless, of course, the system is designed so as to run continuously in which the case the just discussed steps may be eliminated).

During the process of active updating of random data, the transducer output is read at 408 and then tested at 410 to insure that there is indeed some requested physical activity taking place so as to change the transducer output by at least some predetermined increment from the last sample taken. If so, then the new current transducer output is utilized at 412 in accordance with conventional techniques to determine and store at least one new random data point value RN. As will be appreciated, a suitable random data pool might comprise 64 random bits, 128 random bits, etc. which can dynamically be configured depending on the type of algorithm employed or the required need. The process may determine one or more bits of such data pool at each timed interrupt execution of this routine. The current execution instance of the timed interrupt routine is then exited at 414 until again entered at the end of another elapsed timed interrupt period.

As those in the art will appreciate, there may be many variations and modifications of the above described exemplary embodiments which yet retain some or all of the novel features and advantages of these embodiments. Accordingly, all such modifications and variations are intended to be included within the scope of the appended claims.

The invention claimed is:

1. A non-transitory computer-readable medium comprising instructions that, when executed, cause an electronic device to:
    store random data in a random data pool in a memory of the electronic device;
    sense motion of the electronic device using a transducer of the electronic device, wherein the transducer is configured to generate an output in response to sensed motion;
    generate new random data in accordance with the output of the transducer when sensed motion exceeds a threshold; and
    store the new random data in the random data pool in the memory.

2. The non-transitory computer-readable medium of claim 1, wherein the threshold is a randomness threshold, wherein the instructions further cause the electronic device to determine whether the output of the transducer is randomly varying by an amount which exceeds the randomness threshold, and generate new random data by generating the new random data only when the output of the transducer is randomly varying by an amount which exceeds the randomness threshold.

3. The non-transitory computer-readable medium of claim 1, wherein the instructions further cause the electronic device to determine whether the output of the transducer differs from a previous output of the transducer by an amount which exceeds the threshold, and generate new random data by generating the new random data only when the output of the transducer differs from a previous output of the transducer by an amount which exceeds the threshold.

4. The non-transitory computer-readable medium of claim 3, wherein the instructions further cause the electronic device to:
    display on a display of the electronic device, when the random number pool is out of date, a first prompt to update the random number pool;
    display on the display of the electronic device, in response to an election to update the random number pool, a second prompt for predetermined user action causing random physical movement of the electronic device for a duration; and
    generate the new random data in accordance with the output of the transducer at regular intervals during the duration.

5. The non-transitory computer-readable medium of claim 1, wherein the instructions further cause the electronic device to:
    determine whether the random number pool is out of date;
    sense motion of the electronic device when the random number pool is out of date; and
    generate the new random data in accordance with the output of the transducer only when the sensed motion exceeds the threshold.

6. The non-transitory computer-readable medium of claim 5, wherein the instructions further cause the electronic device to determine at regular intervals whether the random number pool is out of date.

7. The non-transitory computer-readable medium of claim 5, wherein the instructions further cause the electronic device to determine at start-up of the electronic device whether the random number pool is out of date.

8. The non-transitory computer-readable medium of claim 1, wherein the instructions further cause the electronic device to generate an encryption key from a random number from the random number pool.

9. The non-transitory computer-readable medium of claim 8, wherein the electronic device is a wireless communication device and the encryption key is used in data communication processes.

10. The non-transitory computer-readable medium of claim 8, wherein the instructions further cause the electronic device to encrypt and decrypt data in data communication processes using the encryption key.

11. A non-transitory computer-readable medium comprising instructions that, when executed, cause an electronic device to:
  store random data in a random data pool in a memory of the electronic device;
  sense motion of the electronic device using a transducer of the electronic device, wherein the transducer is configured to generate an output in response to sensed motion;
  continuously generate new random data in accordance with the output of a transducer when sensed motion exceeds a threshold; and
  store the new random data in the random data pool in the memory.

12. The non-transitory computer-readable medium of claim 11, wherein the threshold is a randomness threshold, wherein the instructions further cause the electronic device to determine whether the output of the transducer is randomly varying by an amount which exceeds the randomness threshold, and generate new random data by continuously generating the new random data only when the output of the transducer is randomly varying by an amount which exceeds the randomness threshold.

13. The non-transitory computer-readable medium of claim 11, wherein the instructions further cause the electronic device to determine whether the output of the transducer differs from a previous output of the transducer by an amount which exceeds the threshold, and generate new random data by continuously generating the new random data only when the output of the transducer differs from a previous output of the transducer by an amount which exceeds the threshold.

14. The non-transitory computer-readable medium of claim 11, wherein the instructions further cause the electronic device to generate an encryption key from a random number from the random number pool.

15. The non-transitory computer-readable medium of claim 14, wherein the electronic device is a wireless communication device and the encryption key is used in data communication processes.

16. The non-transitory computer-readable medium of claim 14, wherein the instructions further cause the electronic device to encrypt and decrypt data in data communication processes using the encryption key.

\* \* \* \* \*